(12) United States Patent
Alzaydi

(10) Patent No.: US 10,365,473 B1
(45) Date of Patent: Jul. 30, 2019

(54) ELECTRO-MAGNETIC ACTUATION ROTATIONAL ADAPTIVE MIRROR

(71) Applicant: King Fahd University of Petroleum and Minerals, Dhahran (SA)

(72) Inventor: Ammar Alzaydi, Dhahran (SA)

(73) Assignee: King Fahd University of Petroleum and Minerals, Dhahran (SA)

( * ) Notice: Subject to any disclaimer, the term of this patent is extended or adjusted under 35 U.S.C. 154(b) by 0 days.

(21) Appl. No.: 15/947,235

(22) Filed: Apr. 6, 2018

(51) Int. Cl.
*G02B 26/08* (2006.01)
*G02B 7/182* (2006.01)
*G02B 7/185* (2006.01)
*G02B 5/10* (2006.01)

(52) U.S. Cl.
CPC .......... *G02B 26/0825* (2013.01); *G02B 5/10* (2013.01); *G02B 7/185* (2013.01); *G02B 7/1828* (2013.01)

(58) Field of Classification Search
CPC .... G02B 26/0825; G02B 5/10; G02B 7/1828; G02B 7/185
See application file for complete search history.

(56) References Cited

U.S. PATENT DOCUMENTS

| | | | | |
|---|---|---|---|---|
| 5,291,337 A * | 3/1994 | Greger | ................ | G02B 5/10 359/846 |
| 5,880,896 A * | 3/1999 | Ishii | ............. | G02B 26/0825 359/224.1 |
| 6,986,587 B2 * | 1/2006 | Kaneko | ............. | G02B 26/0825 359/291 |
| 7,123,397 B2 * | 10/2006 | Murakami | ......... | G02B 26/0825 359/224.1 |
| 8,794,773 B2 | 8/2014 | Camet et al. | | |
| 9,810,900 B2 | 11/2017 | Camet et al. | | |
| 2003/0214734 A1 | 11/2003 | Nishioka et al. | | |
| 2004/0233553 A1 * | 11/2004 | Shibata | ............. | G02B 26/0825 359/846 |
| 2004/0240078 A1 * | 12/2004 | Sekiyama | ................ | G02B 7/08 359/726 |
| 2007/0097836 A1 * | 5/2007 | Kurozuka | .......... | G02B 26/0825 369/112.29 |
| 2007/0165312 A1 * | 7/2007 | Aoki | .................. | G02B 26/0825 359/846 |

* cited by examiner

*Primary Examiner* — Cara E Rakowski
*Assistant Examiner* — Magda Cruz
(74) *Attorney, Agent, or Firm* — Oblon, McClelland, Maier & Neustadt, L.L.P.

(57) ABSTRACT

A mirror is comprised of a reflective film including a flexible polymer with a reflective coating, at least one magnet attached to the reflective film, a motor configured to rotate the reflective film wherein the reflective film is secured to the motor, and at least one electromagnet configured to receive an applied voltage. The mirror further comprises a first flexible support layer to increase the rigidity of the reflective film during curvature change and a second rigid support layer to prevent the reflective film, first support layer, and at least one magnet from contacting the at least one electromagnet.

18 Claims, 13 Drawing Sheets

*FIG. 11A*
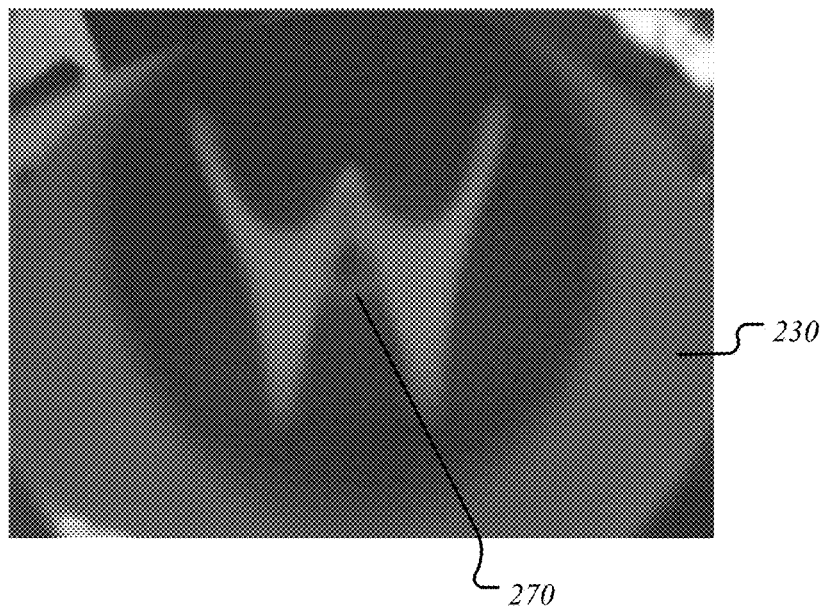
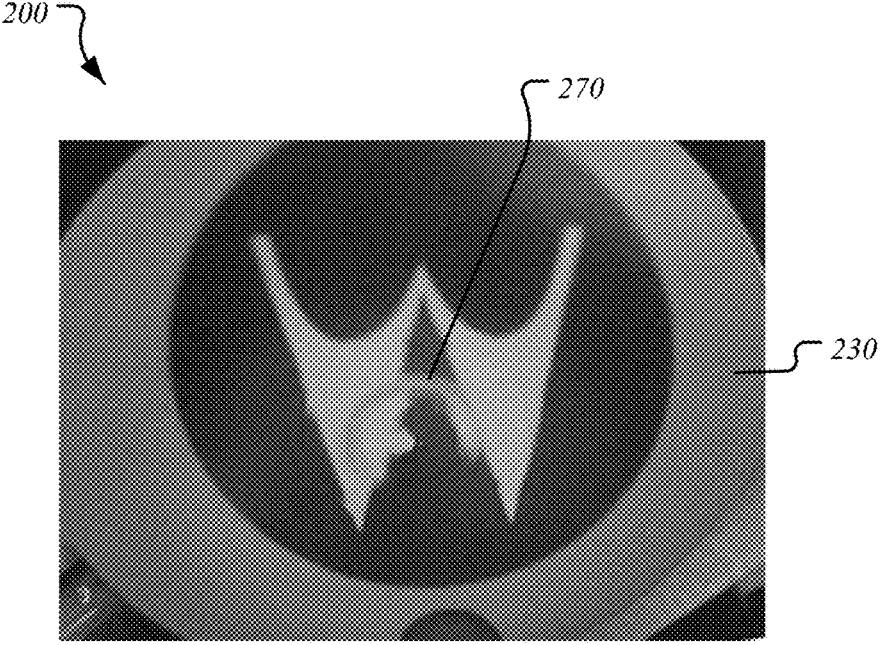
*FIG. 11B*

EL ECTRO-MAGNETIC ACTUATION
ROTATIONAL ADAPTIVE MIRROR

BACKGROUND

Field of the Invention

The present disclosure is related to a mirror that includes a flexible reflective surface that is rotatable.

Description of the Related Art

At present, most actuated optical mirror membranes are fabricated using bulk or surface micromachining of silicon; both are expensive and complex processes. Thus, a method is needed to produce mirror membranes without any circular size restriction while exhibiting high flatness and high deformation with low applied voltage. A simplified polymer-based process can facilitate the use of actuated mirrors in a variety of applications.

Mirrors that can modify the reflected wave front arbitrarily require many degrees of freedom, typically achieved by the use of either segmented mirror arrays or a continuous membrane reflector acted on by an actuator array. These systems are inherently capable of variable focus while controlling wave-front errors such as spherical aberration. However, such systems also require a large number of interconnections between the control system and the individual actuators. This requirement can be an obstacle to miniaturization of the overall optical system. Mirrors intended for a specific wave-front modification, such as focal control, require few degrees of freedom and few control connections. Ideally, these mirrors can be designed to minimize wave-front errors such as spherical aberration, while providing a large range of focal control. The mirror can use minimal interconnection between the controls and the array of electro-magnetic controllers, allowing for fewer factors to consider when modifying mirror concavity during rotation.

In addition to focus control and optical switching, several other applications, including barcode scanners, optical read-write heads, and scanned-beam imaging or display systems, can benefit from an optical variable-focus lens.

A significant advantage of the metallized polyester film technology described herein is that it permits the fabrication of micro-mirror arrays at considerably lower cost and complexity than equivalent silicon-based structures.

It is therefore one aspect of the present disclosure to provide a deformable, rotating mirror apparatus capable of being fabricated wherein the reflective surface of the mirror can contain imperfections and the rotation of the mirror will effectively smooth and flatten the imperfections to retain a mirror-like reflectance. In another aspect of the present disclosure, magnets attached to the rotating mirror can be repelled or attracted by electromagnets receiving an applied voltage in order to adjust the curvature of the mirror.

SUMMARY

The present disclosure relates to an apparatus for utilization of reflective polyester films to fabricate deformable mirrors.

In one embodiment of the invention, a mirror is comprised of a reflective film including a flexible polymer with a reflective coating, at least one magnet attached to the reflective film, a motor configured to rotate the reflective film wherein the reflective film is secured to the motor, and at least one electromagnet configured to receive an applied voltage. The mirror further comprises a first flexible support layer to increase the rigidity of the reflective film during curvature change and a second rigid support layer to prevent the reflective film, first support layer, and at least one magnet from contacting the at least one electromagnet.

BRIEF DESCRIPTION OF THE DRAWINGS

A more complete appreciation of the disclosure and many of the attendant advantages thereof will be readily obtained as the same becomes better understood by reference to the following detailed description when considered in connection with the accompanying drawings, wherein:

FIG. 11A is an image of a deformable mirror while rotating and reflecting an image that is out of focus according to one or more aspects of the disclosed subject matter;

FIG. 11B is an image of a deformable mirror while rotating with an applied voltage to the electromagnets and reflecting an image that is in focus according to one or more aspects of the disclosed subject matter;

DETAILED DESCRIPTION

Figure 1:
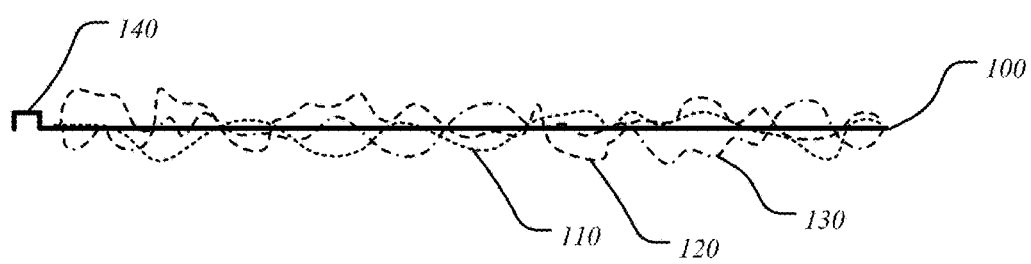
FIG. 1 illustrates an example of a cross section of a film that has been smoothed via film rotation according to one or more aspects of the disclosed subject matter.

The foregoing "background" description is for the purpose of generally presenting the context of the disclosure. Work of the inventor, to the extent it is described in this background section, as well as aspects of the description which may not otherwise qualify as prior art at the time of filing, are neither expressly or impliedly admitted as prior art against the present invention. The foregoing paragraphs have been provided by way of general introduction, and are not intended to limit the scope of the following claims. The described embodiments, together with further advantages, will be best understood by reference to the following detailed description taken in conjunction with the accompanying drawings.

Referring now to the drawings, wherein like reference numerals designate identical or corresponding parts throughout several views, the following description relates to a system, apparatus, and associated methodology for a deformable mirror.

When a surface, for example a circular reflective disc, that is not perfectly flat is rotated about its center, any imperfections that contribute to the non-flat profile of the surface can be effectively smoothed. As the surface rotates at high speed, for example 5-10 rotations per second (RPS), each imperfection is quickly and continually replaced by a cleaner, flat surface at the same radial position. Thus, for a reflective surface that contains imperfections, the flat surface area and imperfect surface area can merge gradually during high speed rotation to produce an averaged surface profile that appears nearly flat, clear, and reflective. This imperfection smoothing can enable fabrication of reflective surfaces for rotational mirrors that may contain impurities, such as dust and debris. Increased tolerance for imperfections can allow the use of less intensive fabrication techniques and faster production.

FIG. 1 illustrates an exaggerated example of this smoothing for a cross section of a smooth film 100. For example, three imperfectly fabricated films with three different cross-sections exhibiting surface impurities—a first stationary cross section 110, a second stationary cross section 120, and a third stationary cross section 130—can be non-flat. Upon high speed rotation of the films about a center point 140, the averaged rotating surface can yield the smooth film 100 cross section that is more flat than the three films individually when stationary.

Figure 2:
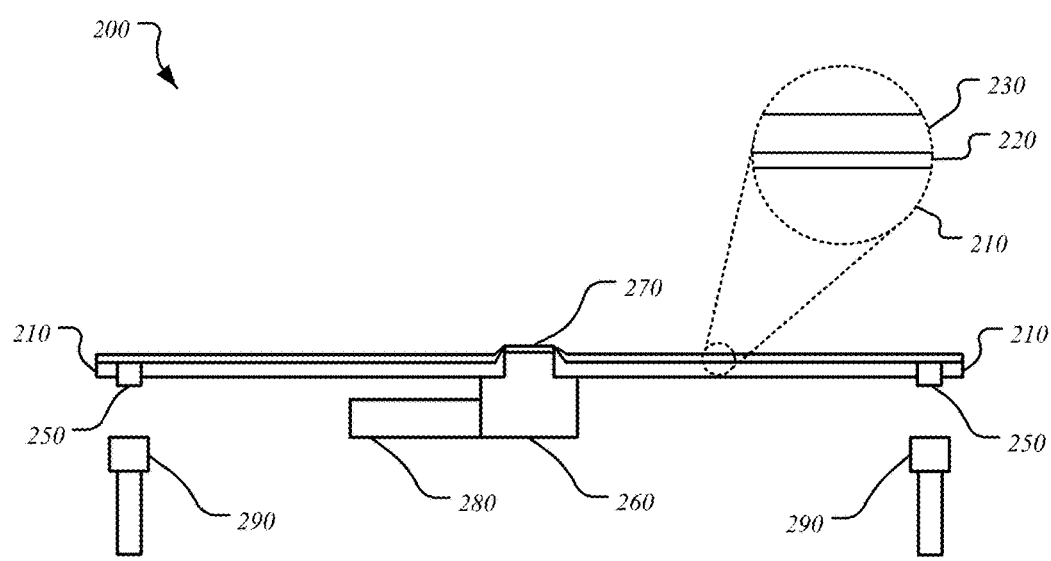
FIG. 2 is a schematic of a cross section of a deformable mirror in one embodiment while at rest or while no voltage has been applied to the electromagnets according to one or more aspects of the disclosed subject matter.

FIG. 2 illustrates a cross section of a deformable mirror 200. In one embodiment, the deformable mirror 200 can include a polymer support 210, a flexible support 220, and a reflective film 230, wherein the flexible support 220 and reflective film 230 can be joined together using myriad materials to increase mechanical stability during high speed rotation. The reflective film 230 can include at least one layer of a reflective material coated on a polymer, for example a metallized polymer. The reflective film 230 can be of a diffuse or scattering reflectance, or preferably, specular reflectance. The reflective film 230 can have a reflectance of 50% or more as compared to a National Institute of Standards and Technology (NIST) spectral reflectance standard, for example NIST 38060S, for wavelengths from 250-2500 nm, or for visible light wavelengths from 350-900 nm. The reflective film 230 can have a reflectance of 80% or more, preferably 90% or more, 95% or more or 98% or more as compared to NIST 38060S for a mirror-like reflectance for wavelengths from 250-2500 nm, or for visible light wavelengths from 350-900 nm. Non-limiting examples of metals for metallization can include gold, silver, and aluminum. Non-limiting examples of substrates for the reflective film 230 can include at least one of metallized polyester, polyethylene terephthalate, polyvinylidene chloride, polylactic acid, acrylic, aluminum, low-density polyethylene, linear low-density polyethylene, a metal, a metal alloy, mirrored plexiglass, or any combinations thereof. For example, a film known as Mylar® by Dupont. For example, films known as Scotchlite Reflective Tape, VM2000 foil, SA-85 solar film, and Silver Flux by 3M. For example, aluminum sheets by Alanod or Alcan. For example, SolaReflex material by Clear Dome Solar. For example, Heat Shield, Mirrorbrite, Prismabrite, and Astrolon by Metallized Products. Non-limiting examples of fabrication methods for the reflective material can include sputter coating, thermal evaporation, electron-beam evaporation, and spray coating. The reflective film 230 can be deposited on top of the flexible support 220, wherein the flexible support 220 can provide structural rigidity and prevent undesirable effects during rotation, such as buckling. Notably, the reflective film 230 and flexible support 220 can be very thin, for example less than 1 mm thick, while remaining free-standing and flexible. Other materials for the flexible support 220 can be used, for example, parchment or wax. In one embodiment, circular deformable mirror 200 can be fabricated with diameters ranging from 110 mm to 230 mm and the reflective film 230 can be fabricated with a thickness from 0.1 to 2 mm. Other sizes and dimensions for deformable mirror 200 are contemplated by embodiments described herein and will depend on the intended use of deformable mirror 200.

In an embodiment, a chemical adhesive can be used to bond the reflective film 230 to the flexible support 220 to increase the rigidity further. The thickness of the flexible support 220 can be varied according to the diameter of the deformable mirror 200. For example, a deformable mirror 200 with a larger radius can require a thicker flexible support 220 to maintain the same rigidity of the reflective material during rotation as compared to a deformable mirror with a smaller radius.

The polymer support 210 can be fabricated to the same size as the reflective film 230 and flexible support 220 and be disposed below the reflective film 230 and flexible support 220. The polymer support 210 can be a flat disc configured to help prevent the reflective film 230 and flexible support 220 from taking a non-flat profile (e.g. buckling, bunching, sagging, etc.) when at rest or low rotation speeds. Non-limiting examples of materials for the polymer support 210 include at least one of acrylonitrile butadiene styrene (ABS), polypropylene, polycarbonate, polyvinyl chloride, high-density polyethylene, and carbon fiber epoxy. Non-limiting examples of fabrication methods for the polymer support 210 include extrusion, injection molding, and 3D printing.

The deformable mirror 200 can include at least one permanent magnets 250 that are attached to the bottom face of the flexible support 220 layer (the face not in contact with the reflective film 230). In order to maintain a flat profile for the flexible support 220 and reflective film 230 while at rest or during low RPS, a volume of material can be removed from the polymer support 210 that allows the at least one permanent magnets 250 to sit inside the polymer support 210. In one embodiment, the at least one permanent magnets 250 can be cylindrical with flat tops, have a 4 mm diameter and 5 mm length, wherein the flat top of the magnet is chemically adhered to the underside of the flexible support 220. At least one cylindrical holes can be drilled into the polymer support 210, wherein the diameter of the drilled holes is the same or wider than the diameter of the at least one cylindrical permanent magnets 250. When the deformable mirror 200 is at rest or at low RPS, the at least one permanent magnets 250 can sit inside the holes. The at least one permanent magnets 250 can be attached to the flexible support 220 towards the outer edge of the disc. Other sizes and dimension for the at least one permanent magnets 250 are contemplated by embodiments described herein and will depend on the intended use of deformable mirror 200.

Figure 3:
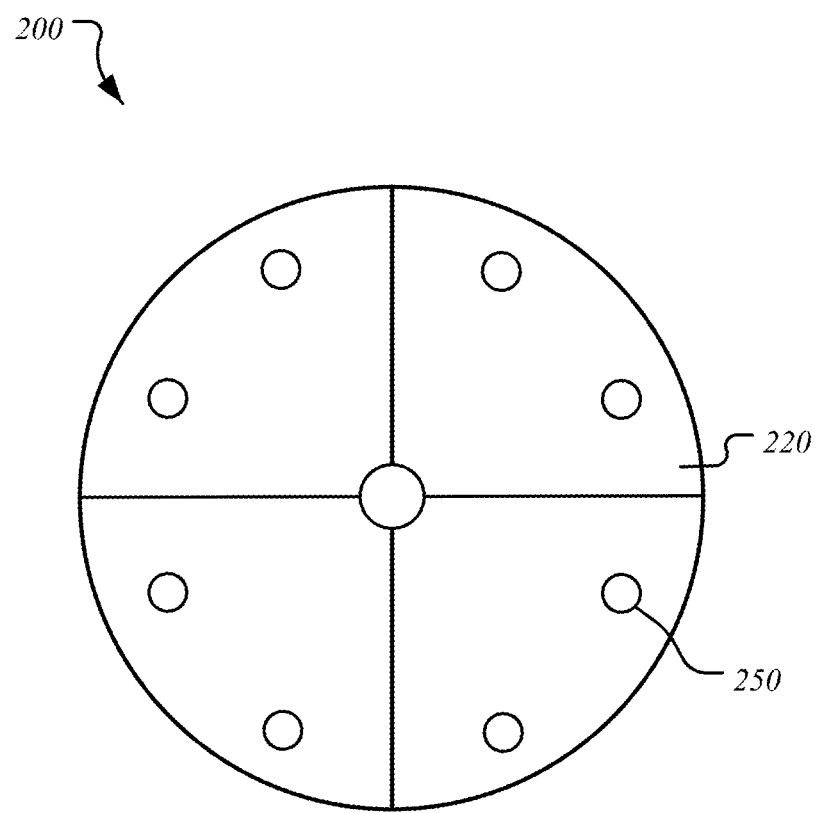
FIG. 3 is a schematic of a bottom view of a deformable mirror according to one or more aspects of the disclosed subject matter.

FIG. 3 illustrates a view of the bottom of the deformable mirror 200 with the at least one permanent magnets 250 attached to the flexible support 220, wherein the polymer support 210 is not visible. In this example, eight permanent magnets 250 are attached to the flexible support 220, wherein the cross-section is circular.

Figure 4:
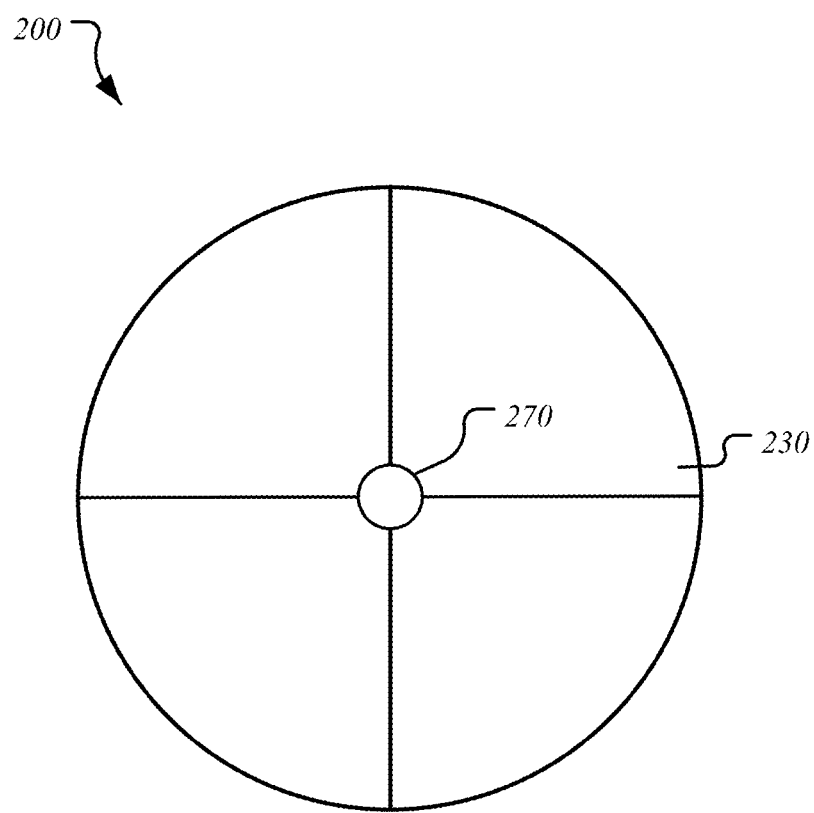
FIG. 4 is a schematic of a top view of a deformable mirror according to one or more aspects of the disclosed subject matter.

FIG. 4 illustrates a top view of the deformable mirror 200, wherein the at least one permanent magnets 250 are not visible from the top.

The deformable mirror 200 can be mounted on a rotating head 260 at the center of the deformable mirror 200. The deformable mirror 200 can be secured via a support ring 270 that is configured to clamp the flexible support 220 and reflective film 230 to the rotating head 260. The rotating head can be driven by a motor or engine 280, wherein the rotating head can be programmed to rotate at a predetermined speed or multiple speeds over a predetermined length of time, or indefinitely. For example, rotation can be programmed for 1 second, 1 minute, or more than 1 minute until an instruction is executed to stop the rotation. The rotation can be a clock-wise or counter-clock-wise rotation, or a mix of both directions wherein the rotation switches after a predetermined length of time. The rotation speed can be programmed to rotate at varying rotations per minute (RPM), for example 100 RPM, 5,000 RPM, or 20,000 RPM.

The deformable mirror 200 can include at least one electromagnets 290 disposed below the at least one permanent magnets 250, wherein the at least one electromagnets 290 are radially distanced from the center of the deformable mirror 200 such that they are vertically aligned with the at least one permanent magnets 250. The at least one electromagnets 290 can be electrically connected to a computer (not shown) comprising processing circuitry configured to execute program instruction to adjust a voltage applied to the at least one electromagnets 290. For example, a voltage can be applied from a voltage source measure unit (SMU). In one embodiment, the at least one electromagnets 290 can be configured to repel the at least one permanent magnets 250 and cause vertical displacement. For example, the at least one electromagnets 290 can receive an applied voltage and subsequently repel the at least one permanent magnets 250 attached to the flexible support 220 and reflective film 230 when the surface of the deformable mirror 200 is oriented relatively horizontally to the ground such that the force of gravity acts on the at least one permanent magnets 250 in such a way to force them towards the direction of the at least one electromagnets 290. When the applied voltage is high enough, this repulsion can result in the at least one permanent magnets 250 being pushed vertically upwards (away from the at least one electromagnets 290) above the horizontal plane. Since the at least one permanent magnets 250 are attached to the flexible support 220 and reflective film 230, the at least one permanent magnets 250 would concomitantly lift both layers vertically upwards. In an alternative embodiment, the at least one electromagnets 290 can be configured to attract the at least one permanent magnets 250. The at least one electromagnets 290 can have a cylindrical shape with a diameter of, for example, 3-10 mm and a length of 10-100 mm. Other sizes and dimension for the at least one electromagnets 290 are contemplated by embodiments described herein and will depend on the intended use of deformable mirror 200.

Figure 5:
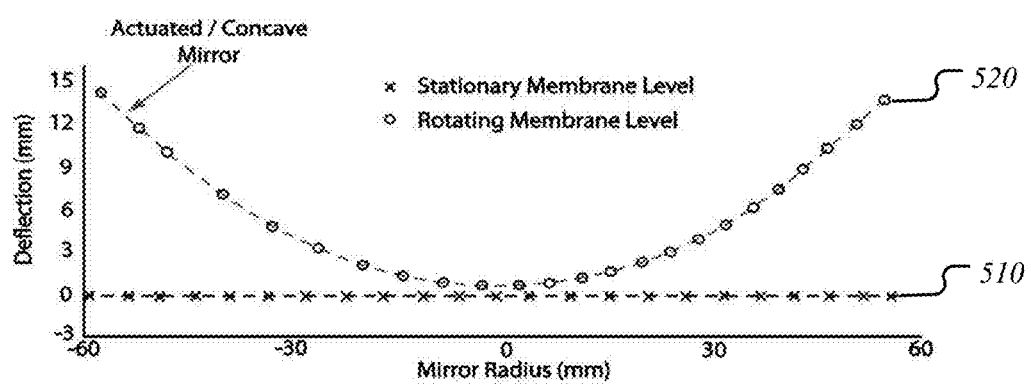
FIG. 5 is a schematic of the edge deflection of a deformable mirror at rest and while rotating with an applied voltage to the electromagnets according to one or more aspects of the disclosed subject matter.

On its own, the rotation of the reflective film 230 and flexible support 220 can result in a smooth mirror-like surface via the averaging effect (for both films that are perfectly flat as well as films that may contain imperfections). When the rotation of the reflective film 230 and flexible support 220 is combined with the vertical displacement of the at least one permanent magnets 250, the deformation caused by the at least one elevated permanent magnets 250 can be averaged as well, resulting in a curved profile. Thus, this combination can allow for tuning of the deformable mirror 200 concavity. As illustrated in FIG. 5, a stationary membrane line profile 510 for a film can change concavity upon application of a voltage to the at least one electromagnets 290, resulting in the rotating membrane line profile 520 for an actuated/concave mirror, wherein incident light is reflected back towards the light source and concentrated at a focal point.

Figure 6:
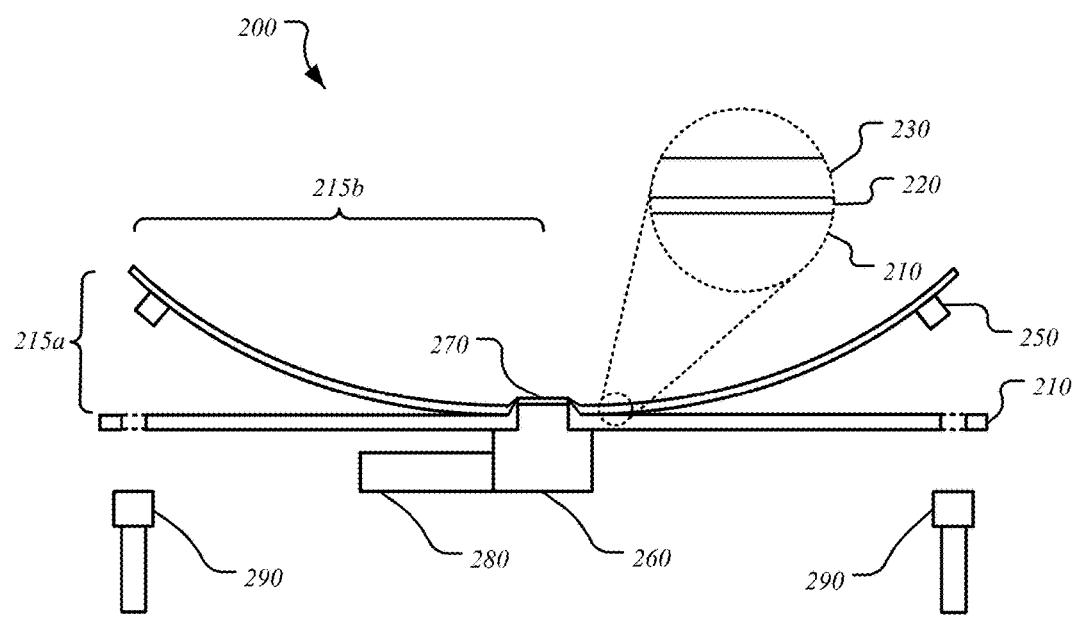
FIG. 6 is a schematic of a cross section of a deformable mirror while rotating with an applied voltage to the electromagnets according to one or more aspects of the disclosed subject matter.
Figure 10:
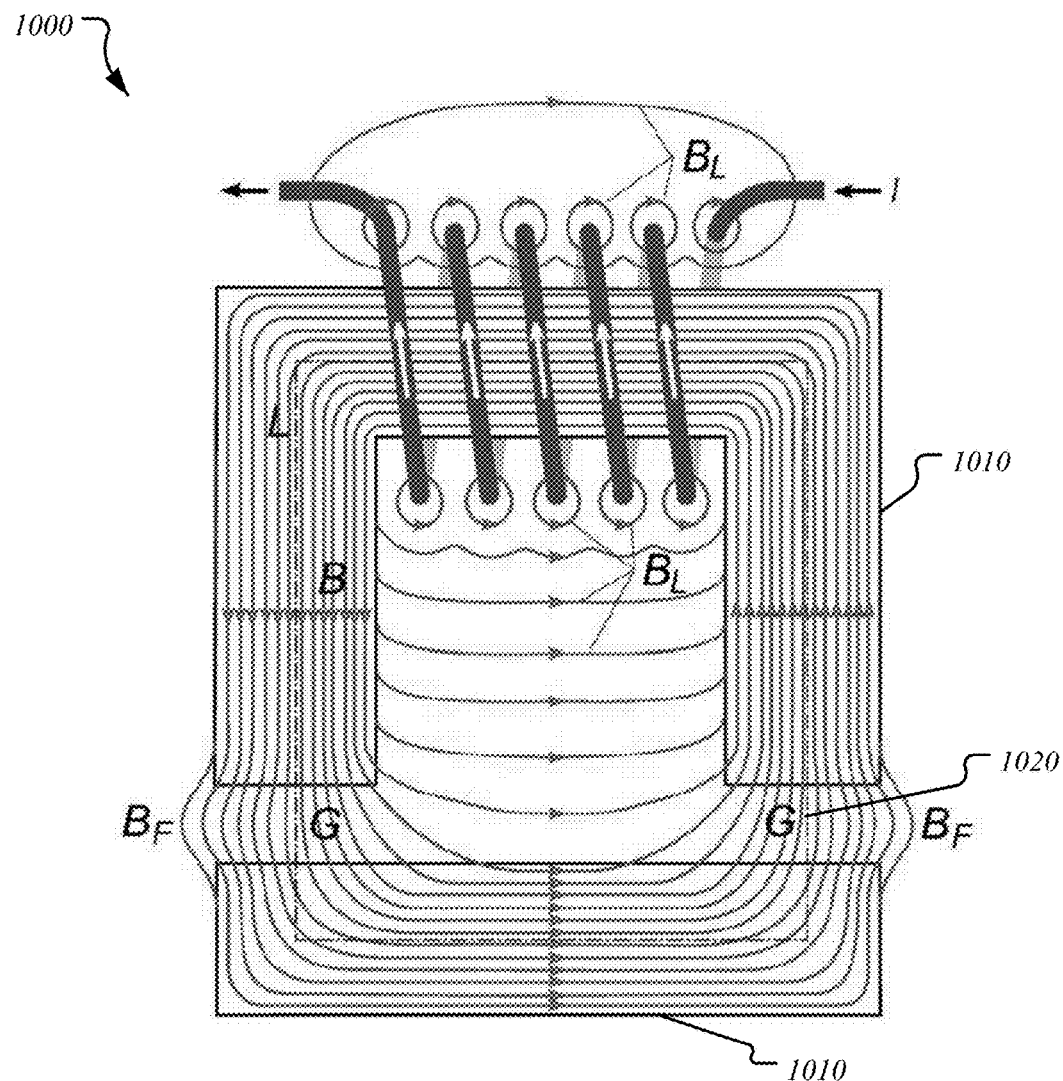
FIG. 10 is a schematic of a typical electromagnet according to one or more aspects of the disclosed subject matter.

FIG. 6 illustrates the reflective film 230 and flexible support 220 shape after application of voltage. In one embodiment, when a voltage is applied to the at least one electromagnets 290 and the at least one permanent magnets 250 are repelled upwards, the reflective film 230 and flexible support 220 with a 120 mm radius becomes concave and results in an edge displacement 215a. For example, application of 12 volts results in an edge displacement 215a of approximately 1.5 cm when the at least one electromagnets 290 are cylindrical and have a diameter of 5 mm and a length of 25 mm, the at least one permanent magnets 250 are cylindrical and have a diameter of 5 mm and a length of 5 mm, and the reflective film 230 and flexible support 220 are rotating at a speed of 1500-2500 RPM. When the reflective film 230 adopts a curved profile, a shortened reflective film radius 215b is observed when viewed perpendicular to the plane of the flat conformation of the reflective film 230. The bendability can also be measured as a ratio of edge displacement 215a compared to the shortened reflective film radius 215b. For example, the bendability can be 100% as measured as a ratio of the edge displacement 215a to the shortened reflective film radius 215b when the two are equal. In another example, the bendability can be measured as an angle. For example, the edge displacement 215a and the shortened reflective film radius 215b can form two perpendicular sides of an isosceles right triangle and a hypotenuse can connect the two perpendicular sides, wherein an angle of 45 degrees is formed at the intersection of the shortened reflective film radius 215b and the hypotenuse. For example, the reflective film 230 can be bendable from −45 to +45 degrees as measured from the center of the reflective film 230 to the reflective film 230 edge relative to the reflective film 230 surface when there is no curvature. In another example, the reflective film can be bendable from 0 to +45 degrees as measured from the center of the reflective film to the reflective film edge relative to the reflective film surface when there is no curvature. During rotation, varying the applied voltage to adjust the edge displacement can change the focal length of the flexible support 220 and reflective film 230, for example from 110 mm to 230 mm, while maintaining almost zero primary spherical aberration. In initial experimentation, the flat, undivided surface of the deformable mirror 200 can buckle and distort when being vertically displaced by the at least one electromagnets 290. To prevent this, the deformable mirror 200 can be divided into a plurality of segments. By dividing the reflective film 230 and flexible support 220 into segments with a small distance of clearance between each segment, for example 0.5 to 1 mm, friction between segments can be avoided as the surface changes concavity. FIGS. 3, 4, and 10 illustrate how the flexible support 220 and reflective film 230 can be divided into a plurality of segments, for example four segments.

Figure 7A:
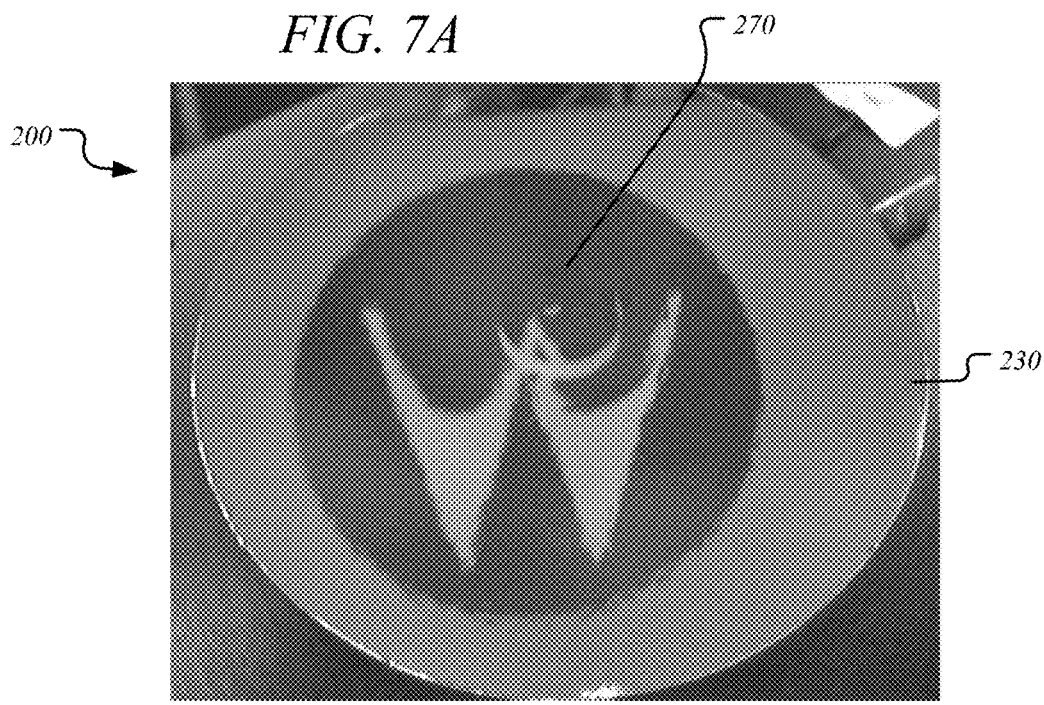
FIG. 7A is an image of a reflective film surface of a deformable mirror while rotating according to one or more aspects of the disclosed subject matter.
Figure 7B:
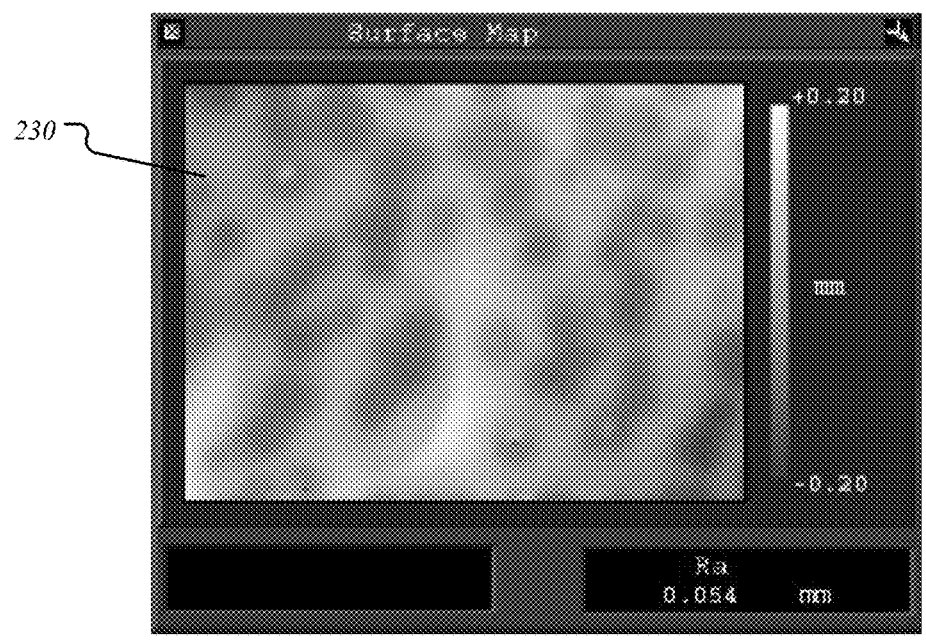
FIG. 7B is a topography surface map of a deformable mirror according to one or more aspects of the disclosed subject matter.

The division of the flexible support 220 and reflective film 230 can also allow for the application of less voltage to the at least one electromagnets 290 since each at least one permanent magnet 250 will only be responsible for carrying the particular segment it is attached to and not the entire surface. Notably, FIG. 7A illustrates how the visible divisions of the flexible support 220 and reflective film 230 will effectively be mitigated by the averaging effect when the deformable mirror 200 is rotating, wherein the overall appearance is that of a uniform surface. FIG. 7B is a surface map detailing typical surface topography of reflective film 230 as measured by a 3-D surface profilometer.

Figure 8:
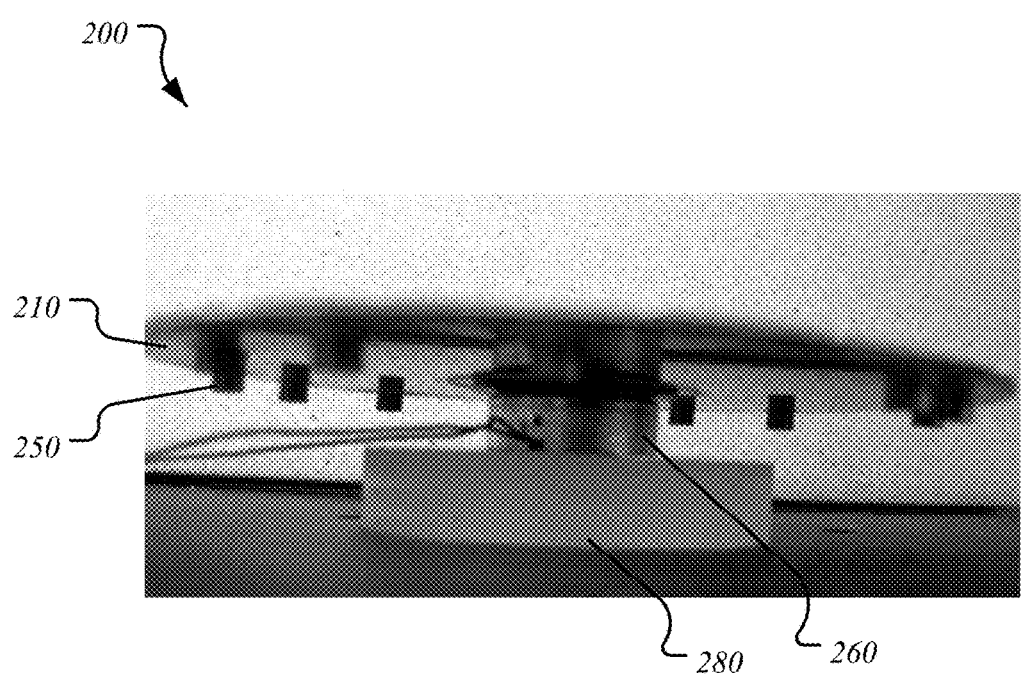
FIG. 8 is an image of a side of a deformable mirror wherein the permanent magnets are shown according to one or more aspects of the disclosed subject matter.

FIG. 8 is an image of the deformable mirror 200 while at rest, wherein the at least one permanent magnets 250 attached to the flexible support 220 are shown protruding through holes in the polymer support 210.

Figure 9A:
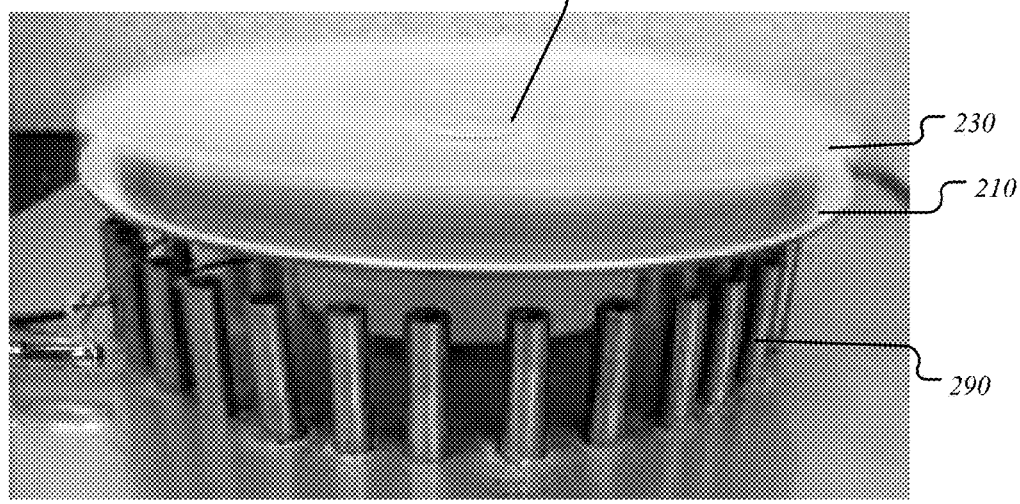
FIG. 9A is a perspective image of a deformable mirror while rotating with an applied voltage to the electromagnets according to one or more aspects of the disclosed subject matter.

FIG. 9A is an image of the deformable mirror 200 while the reflective film 230 and flexible support 220 are rotating with the at least one electromagnets 290 disposed below the flexible support 220 located at the same radius as the at least one permanent magnets 250 attached to the flexible support 220. A voltage has been applied to the at least one electromagnets 290, which has vertically displaced the at least one permanent magnets 250 and changed the concavity of the deformable mirror 200.

Figure 9B:
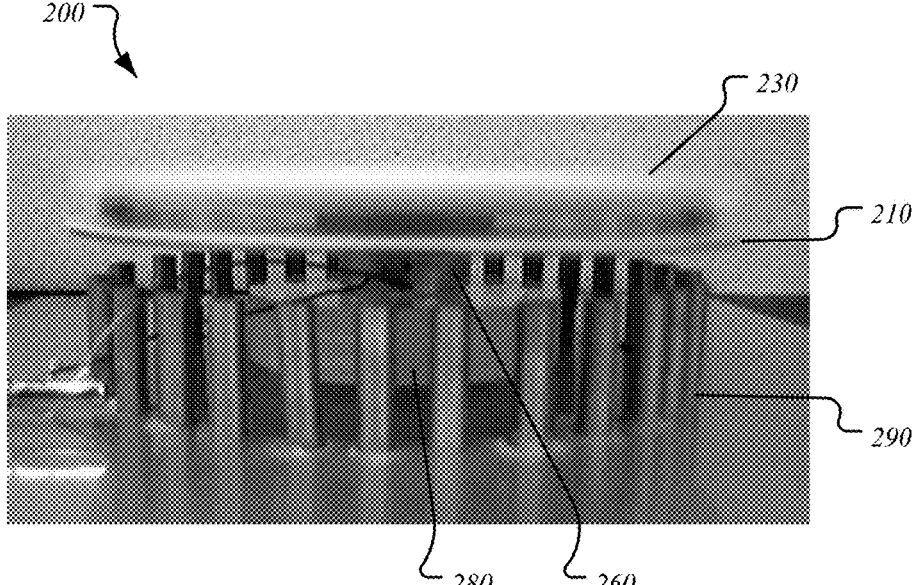
FIG. 9B is an image of a side of a deformable mirror while rotating with an applied voltage to the electromagnets according to one or more aspects of the disclosed subject matter.

FIG. 9B is an image of the deformable mirror 200 from the side while the reflective film 230 and flexible support 220 are rotating, wherein a voltage has been applied to the at least one electromagnets 290, which has vertically displaced the at least one permanent magnets 250 and changed the side profile of the deformable mirror 200 to a non-flat, concave conformation relative to a side oppose the motor 280.

Due to the many different design possibilities of the at least one electromagnets 290 for this mirror application, a general description of electromagnetism equations and design methods will be discussed in this section. Future designs following these same ideas and equations will find them to be sufficient for any mirror size.

FIG. 10 illustrates a magnetic field of a typical electromagnet 1000 which includes an iron core 1010 forming a closed loop with more than one air gaps denoted by (G) or 1020, a core magnetic field B, a plurality of fringing fields $B_F$, and a leakage flux $B_L$ wherein the leakage flux does not contribute to the force exerted by the electromagnet 1000. Both the leakage flux and the fringing fields get larger as the gaps 1020 are increased, reducing the force exerted by the electromagnet 1000. The average length L of the magnetic circuit describes the sum of the length $L_{core}$ in the iron core 1010 and the length $L_{gap}$ in the air gaps.

As shown in FIG. 10, since most of the magnetic field is confined within the outlines of the iron core 1010 loop, this allows a simplification of the mathematical analysis. A common simplifying assumption satisfied by many electromagnets is that the strength of the core magnetic field is constant around the magnetic circuit and zero outside of it. Most of the magnetic field will be concentrated in the iron core 1010. Within the iron core 1010, the core magnetic field will be approximately uniform throughout any cross section, so if in addition the iron core 1010 has roughly constant area throughout its length, the field in the iron core 1010 will be constant. This leaves only the air gaps 1020, if any, between sections of iron core 1010. In the air gaps 1020, the magnetic field lines are no longer confined by the iron core 1010, so they bulge out beyond the outlines of the iron core 1010 before curving back to enter the next piece of iron core 1010 material, reducing the field strength in the air gap 1020. The bulges $B_F$ are called fringing fields. Fringing fields increase the resistance of the magnetic circuit and decrease the total magnetic flux in the iron core 1010. However, as long as the length of the gap is smaller than the cross section dimensions of the iron core 1010, the field in the air gaps 1020 will be approximately the same as in the iron core 1010. In addition, or leakage flux describes some of the magnetic field lines that can take a shorter route and not pass through the entire iron core 1010 circuit, and thus will not contribute to the force exerted by the electromagnet 1000.

The electromagnet 1000 also includes field lines that encircle the wire windings but do not enter the entire iron core 1010. This is also described as leakage flux. Thus, the equations in this section are valid for electromagnets for which: (i) the magnetic circuit is a single loop of core material, possibly broken by a few air gaps, (ii) the core has roughly the same cross sectional area throughout its length, (iii) Any air gaps between sections of core material are not larger than the cross sectional dimensions of the core, (iv) the leakage flux is negligible.

The magnetic field created by the electromagnet 1000 is proportional to both the number of turns in the winding, N, and the current in the wire, I, hence this product, NI, in Ampere-turns, is termed the magneto-motive force. For the electromagnet 1000 with a single magnetic circuit, of which length $L_{core}$ is in the iron core 1010 material and length $L_{gap}$ is in the air gaps 1020, Ampere's Law according to (Richard P. Feynmann, "Ferromagnetism," in Lectures on Physics Vol. II, New York: Addison-Wesley, 1963, ch. 36, pp. 9-11) and (Arthur E. Fitzgerald, Alexander Kusko, Charles Kingsley, "Magnet Circuits and Magnet Materials," in Electric Machinery, 3rd ed. New York, McGraw-Hill, 1971, ch. 1, pp. 3-5) reduces to:

$$NI = H_{core}L_{core} + H_{gap}L_{gap} \quad (1)$$

$$NI = B\left(\frac{L_{core}}{\mu} + \frac{L_{gap}}{\mu_0}\right)$$

where $\mu = B/H$, $\mu_0 = 4\pi(10^{-7})NA^{-2}$ is the permeability of free space or air, and A is in Amperes.

This is a non-linear equation, because the permeability of the core, $\mu$, varies with the magnetic field. For an exact solution, the value of $\mu$ at the magnetic field value used must be obtained from the core material hysteresis curve. If the magnetic field is unknown, the equation must be solved by numerical methods. However, if the magneto-motive force is well above saturation, so the core material is in saturation, the magnetic field will be approximately the saturation value $B_{sat}$ for the material, and won't vary much with changes in NI. For a closed magnetic circuit with no air gaps 1020, most core materials saturate at a magneto-motive force of roughly 800 ampere-turns per meter of flux path.

For most core materials, $$\mu_r = \frac{\mu}{\mu_0} \approx 2000 - 6000.$$

Therefore, in Eq. (1), the second term dominates. Thus, in magnetic circuits with an air gap, the strength of the magnetic field B depends strongly on the length of the air gap, and the length of the flux path in the core is negligible.

The force exerted by an electromagnet on a section of core material is:

$$F = \frac{B^2 A}{2\mu_0} \quad (2)$$

A 1.6 T limit on the field, for example, sets a limit on the maximum force per unit core area, or pressure, an iron-core electromagnet can exert. Roughly:

$$\frac{F}{A} = \frac{B_{sat}^2}{2\mu_0} \approx 1000 \; kPa = 10^6 \frac{N}{m^2} = 145 \; lb \cdot f \cdot in^{-2}$$

In more intuitive units it's useful to remember that at 1 T the magnetic pressure is approximately 4 atmospheres, or kg/cm². Given a random core geometry, the magnetic field needed for a given force can be calculated from Eq. (2). If greater than 1.6 T, a larger core can be used. For a closed magnetic circuit without air gaps 1020, such as would be found in an electromagnet lifting a piece of iron bridged across its poles, Eq. (1) becomes:

$$B = \frac{NI\mu}{L} \quad (3)$$

Substituting into Eq. (2), the force is:

$$F = \frac{\mu^2 N^2 I^2 A}{2\mu_0 L^2} \quad (4)$$

It is evident that to maximize the force, an iron core 1010 with a short flux path and a wide cross sectional area A is preferred. To achieve this, in applications involving moving magnets, for example loudspeaker drivers, a flat cylindrical design is often used. The winding can be wrapped around a short wide cylindrical core that forms one pole and a thick metal housing that wraps around the outside of the windings forms the other part of the magnetic circuit, bringing the magnetic field to the front to form the other pole.

For electromagnets (or permanent magnets) with well-defined poles where the field lines emerge from the core, the force between two electromagnets can be found using the Gilbert model which assumes the magnetic field is produced by magnetic charges on the surface of the poles, with pole strength m and units of Ampere-turn meter. Magnetic pole strength of electromagnets can be found from:

$$m = \frac{NIA}{L} \quad (5)$$

The force between the poles is:

$$F = \frac{\mu_0 m_1 m_2}{4\pi r^2} \quad (6)$$

This model can yield an incorrect magnetic field inside the core, and thus can yield faulty results if the pole of one magnet gets too close to another magnet—but can provide rather acceptable design parameters.

In one embodiment, the deformable mirror 200 can be configured to change the deformable mirror 200 concavity such that it is concave relative to a side opposite the motor 280, wherein the concavity change will change the focus on an image reflected in the deformable mirror 200. As shown in the image in FIG. 11A, a deformable mirror 200 is rotating and the top surface with the reflective film 230 is visible. An image is reflected in the deformable mirror 200 but appears out of focus. A voltage can be applied to the at least one electromagnets 290 such that the at least one electromagnets 290 repel the at least one permanent magnets 250 attached to the flexible support 220. This repulsion can vertically displace the at least one permanent magnets 250 and elevate the edges of the flexible support 220 and reflective film 230 such that the deformable mirror 200 changes concavity and adjusts the focal point of the deformable mirror 200 such that the image shown in the imagine in FIG. 11B comes into focus.

Figure 12A:
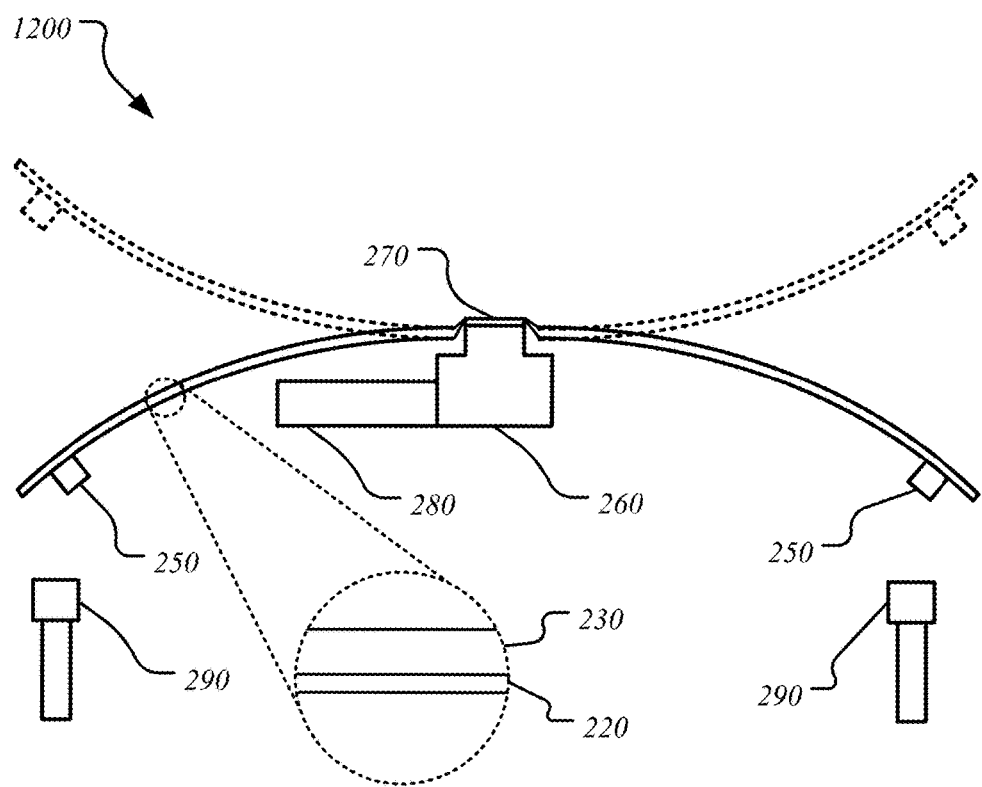
FIG. 12A is a schematic of a deformable mirror without a polymer support layer in an alternative embodiment according to one or more aspects of the disclosed subject matter.

In an alternative embodiment, as illustrated in FIG. 12A, a deformable mirror 1200 can be fabricated without the polymer support 210. At rest, wherein the deformable mirror 1200 is oriented horizontal to the ground, the force of gravity acting on the at least one permanent magnets 250 can cause the flexible support 220 and reflective film 230 to be pulled towards the ground and take on a shape similar to that of an open umbrella with the opening pointed at the ground (the flexible support 220 lends rigidity to the reflective film 230 and resists sagging). At this point, the deformable mirror 1200 can be concave relative to the ground (or convex relative to the sky), as depicted by the solid outline. A voltage can be applied to the electromagnets 290 such that the at least one electromagnets 290 repel the at least one permanent magnets 250. In this manner, the concavity of the deformable mirror 1200 changes such that the deformable mirror 1200 surface returns to nearly flat. Upon further voltage application, the deformable mirror 1200 can reverse concavity such that it becomes convex relative to the ground (or concave relative to the sky). In another embodiment, the deformable mirror 1200 can be oriented to a non-horizontal position relative to the ground, wherein a convex mirror (convex relative to the opposite side of the motor 280) is produced such that it is relevant to applications such as hallway safety mirrors or passenger-side mirrors on vehicles.

Figure 12B:
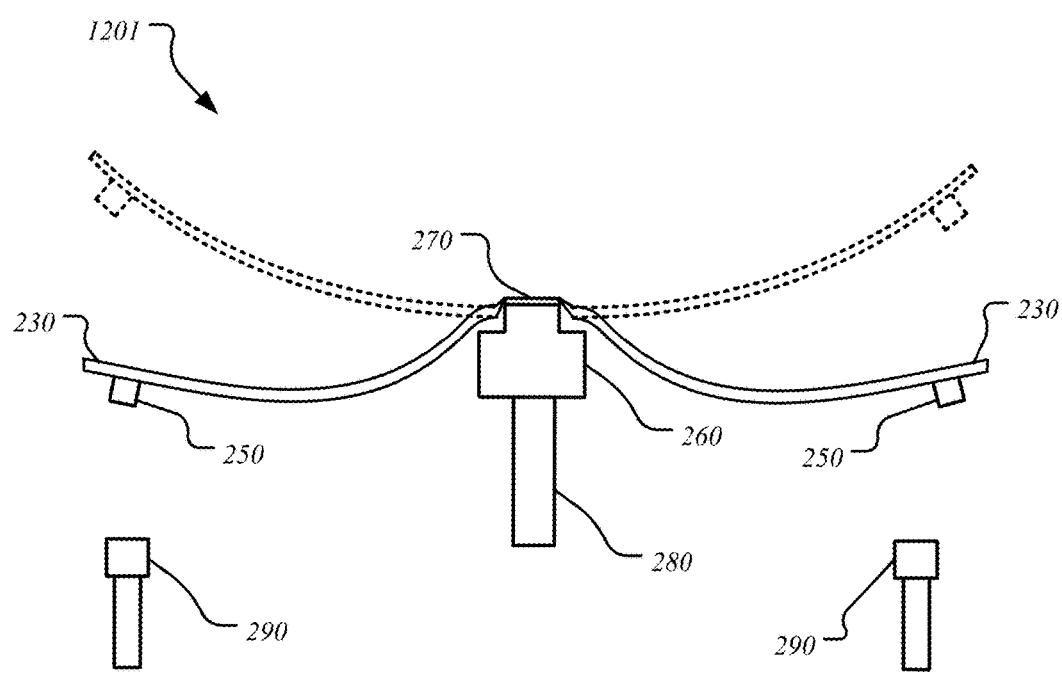
FIG. 12B is a schematic of a deformable mirror without a polymer support layer and flexible support layer in an alternative embodiment according to one or more aspects of the disclosed subject matter.

In another embodiment, as illustrated in FIG. 12B, a deformable mirror 1201 can be fabricated similar to the deformable mirror 1200, wherein the flexible support 220 is not included. The unsupported reflective film 230 can sag in the middle during rotation when the at least one permanent magnets 250 are repelled away from the at least one electromagnets 290.

The deformable mirror 1200, 1201 can be oriented such that the plane of the reflective film 230 surface is rotated at an angle between parallel to the ground while facing upwards and parallel to the ground and facing downwards. In an embodiment, the deformable mirror 1200, 1201 is oriented such that the surface of reflective film 230 is parallel to the ground while facing towards the ground. In this orientation, the at least one electromagnets 290 can be configured to attract the at least one permanent magnets 250 during rotation such that the deformable mirror 1200 can switch between concave and convex, wherein a concave concavity (relative to the ground) can use a smaller amount of applied voltage to the at least one electromagnets 290 compared to the convex concavity (relative to the ground) where a strong attractive force is needed to pull the at least one permanent magnets 250 in the opposite direction to the ground.

In another embodiment, the at least one electromagnets 290 can be configured to individually repel or attract the at least one permanent magnets 250. For example, a circle of 24 electromagnets 290 can be configured to have 6 electromagnets 290 in a repel mode, followed by another 6 in an attract mode, followed by another 6 in a repel mode, followed by the last 6 in an attract mode. In this manner, as the deformable mirror 1200 rotates, the permanent magnets 250 transition between being vertically displaced above the horizontal plane (relative to the surface of the reflective film 230) and below the horizontal plane. This can induce a folded surface topography of the reflective film 230 wherein two sides appear folded upwards and two sides appear folded downwards. This can also be applied to deformable mirror 200, except the surface of the reflective film 230 will not fold beyond a flat profile.

In another example, the at least one electromagnets 290 can be configured such that every other electromagnet 290 repels or attracts. This can induce a rippled surface topography of the reflective film 230. The at least one electromagnets 290 can also be programmed to switch between repel and attract while the deformable mirror 200, 1200, 1201 is rotating to impart an amorphous surface topography that transitions between stationary and in-motion.

In another embodiment, the deformable mirror 200, 1200, 1201 can be configured for various applications. For example, laser applications can use dimensions for the deformable mirror 200, 1200, 1201 that include a reflective film 230 diameter of 0.5-10 cm. For example, cell imaging, analyzing material surfaces, and imaging micron-sized structures can use dimensions for the deformable mirror 200, 1200, 1201 that include a reflective film 230 diameter of less than 1 mm. Advantageously, the surface of the deformable mirror 200, 1200, 1201 in any application can be fabricated with imperfections which will be smoothed when the surface is rotated. Thus, less expensive and higher throughput techniques can be used to produce these devices as compared to devices with impurity-free reflective surfaces.

A number of implementations have been described. Nevertheless, it will be understood that various modifications may be made without departing from the spirit and scope of this disclosure. For example, preferable results may be achieved if the steps of the disclosed techniques were performed in a different sequence, if components in the disclosed systems were combined in a different manner, or if the components were replaced or supplemented by other components.

The foregoing discussion describes merely exemplary embodiments of the present disclosure. As will be understood by those skilled in the art, the present disclosure may be embodied in other specific forms without departing from the spirit or essential characteristics thereof. Accordingly, the disclosure is intended to be illustrative, but not limiting of the scope of the disclosure, as well as the claims. The disclosure, including any readily discernible variants of the teachings herein, defines in part, the scope of the foregoing claim terminology such that no inventive subject matter is dedicated to the public.

The invention claimed is:

1. A mirror, comprising:
    a reflective film including a flexible polymer with a reflective coating, wherein the reflective film is bendable up to 100% as measured as a ratio of reflective film edge displacement to the distance to the center of the film, wherein the reflective film edge displacement is measured relative to a flat reflective film profile;
    at least one magnet attached to the reflective film;
    a motor configured to rotate the reflective film about the center of the reflective film, wherein the reflective film is secured to the motor; and
    at least one electromagnet displaced proximal to the at least one magnet attached to the reflective film, wherein the at least one electromagnet is configured to receive an applied voltage.

2. The mirror of claim 1, wherein:
    the at least one electromagnet is configured to repel the at least one magnet, and
    the reflective film is displaced by the at least one magnet and adopts a curved shape.

3. The mirror of claim 1, wherein:
    the at least one electromagnet is configured to attract the at least one magnet, and
    the reflective film is displaced by the at least one magnet and adopts a curved shape.

4. The mirror of claim 1, wherein the reflective film is separated into more than one section.

5. The mirror of claim 1, further comprising:
    a first support layer disposed adjacent to and provided between the reflective film and the at least one magnet, the first support layer being flexible and configured to increase the rigidity of the reflective film; and
    a second support layer disposed adjacent to the first support layer, the second support layer being rigid and configured to prevent the reflective film and first support layer from contacting the at least one electromagnet.

6. The mirror of claim 5, wherein:
    the at least one electromagnet is configured to repel the at least one magnet, and
    the reflective film and the first support layer are displaced by the at least one magnet and adopts a curved shape.

7. The mirror of claim 5, wherein:
    the at least one electromagnet is configured to attract the at least one magnet, and
    the reflective film and the first support layer are displaced by the at least one magnet and adopts a curved shape.

8. The mirror of claim 5, wherein the reflective film and the first support layer are separated into more than one section.

9. The mirror of claim 5, wherein the second support layer includes a removed amount of volume for the more than one magnet to sit in when the reflective film and the first support layer adopt a flat or nearly-flat profile.

10. The mirror of claim 5, wherein the reflective film and the first support layer are chemically bonded together.

11. The mirror of claim 5, wherein a material of the first support layer includes at least one of paper, cardboard, parchment, or wax.

12. The mirror of claim 5, wherein a material for the second support layer includes at least one of acrylonitrile butadiene styrene (ABS), polypropylene, polycarbonate, polyvinyl chloride, high-density polyethylene, and carbon fiber epoxy.

13. The mirror of claim 1, wherein a material of the mirror includes at least one of metallized polyester, polyvinylidene chloride, polylactic acid, low-density polyethylene, or linear low-density polyethylene.

14. The mirror of claim 1, wherein the reflective film is secured to the motor via a ring clamp.

15. The mirror of claim 1, wherein the electromagnets are configured to change between a repulsive and attractive mode during rotation of the reflective film.

16. The mirror of claim 1, wherein the electromagnets and the magnets being a cylindrical shape.

17. The mirror of claim 1, wherein the reflective film includes more than one repeating couple of flexible polymer and reflective coating.

18. The mirror of claim 1, wherein the reflective film shape is circular.

* * * * *